(12) United States Patent
Kanamori

(10) Patent No.: US 8,826,718 B2
(45) Date of Patent: Sep. 9, 2014

(54) METHOD AND ROTARY ENCODER FOR ESTIMATION OF ECCENTRIC VALUE

(75) Inventor: Hiroyuki Kanamori, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 198 days.

(21) Appl. No.: 13/323,098

(22) Filed: Dec. 12, 2011

(65) Prior Publication Data

US 2012/0151987 A1     Jun. 21, 2012

(30) Foreign Application Priority Data

Dec. 20, 2010   (JP) ................................ 2010-283302

(51) Int. Cl.
*G01D 18/00*    (2006.01)
*G01B 11/27*    (2006.01)
*G01D 5/347*    (2006.01)
*G01D 5/244*    (2006.01)

(52) U.S. Cl.
CPC ............ *G01D 5/3473* (2013.01); *G01B 11/272* (2013.01); *G01D 5/24485* (2013.01)
USPC ............................... 73/1.75; 33/1 PT; 702/94

(58) Field of Classification Search
USPC ............... 356/237, 373, 375, 423; 369/53.22, 369/44.26; 73/1.75–1.78; 33/1 PT
See application file for complete search history.

(56) References Cited

U.S. PATENT DOCUMENTS

| | | | |
|---|---|---|---|
| 4,486,870 A  * | 12/1984 | Pettigrew et al. .......... | 369/30.04 |
| 4,633,419 A  * | 12/1986 | Niiho et al. .................... | 702/154 |
| 5,844,676 A  * | 12/1998 | Southam et al. ........... | 356/237.1 |
| 6,711,109 B1 * | 3/2004 | Fukuda ....................... | 369/53.14 |
| 6,829,205 B2 * | 12/2004 | Fukumoto ................... | 369/53.14 |
| 7,283,439 B2 * | 10/2007 | Shimano et al. ........... | 369/44.37 |
| 7,787,341 B2 * | 8/2010 | Nakane et al. .............. | 369/53.22 |
| 7,834,618 B2 | 11/2010 | Moura et al. | |
| 2001/0045824 A1 | 11/2001 | Godler et al. | |
| 2004/0025357 A1* | 2/2004 | Schroder ........................ | 33/1 PT |
| 2008/0298222 A1* | 12/2008 | Hirose et al. ................ | 369/275.4 |
| 2009/0015248 A1 | 1/2009 | Moura et al. | |

(Continued)

FOREIGN PATENT DOCUMENTS

| | | |
|---|---|---|
| EP | 2233892 | 9/2010 |
| JP | 4433240 | 12/2010 |
| JP | 2011099802 A * | 5/2011 |
| WO | 2009/003193 | 12/2008 |

OTHER PUBLICATIONS

English Translation of JP 2011099802 A.*

(Continued)

*Primary Examiner* — Hezron E Williams
*Assistant Examiner* — Alexander Mercado
(74) *Attorney, Agent, or Firm* — Greenblum & Bernstein, P.L.C.

(57) ABSTRACT

An angle detection apparatus includes a grating disk supported by a rotation axis and three or more detectors arrayed proximate to a front surface of the grating disk at equal distances in a circumferential direction of the grating disk. A rotation angle of the grating disk rotated by a reference angle from a predetermined initial position is detected by each of the detectors. An angle error at each of the detectors is measured from a difference between the rotation angle and the reference angle. A tangential vector is acquired by rotating by 90° a directional vector of each of the detectors relative to the rotation center. An eccentricity vector is calculated whose inner product with the tangential vector is the angle error.

3 Claims, 9 Drawing Sheets

(56) References Cited

U.S. PATENT DOCUMENTS

| | | | |
|---|---|---|---|
| 2010/0132432 A1* | 6/2010 | Wallace et al. | 73/1.75 |
| 2010/0245841 A1 | 9/2010 | Parriaux et al. | |
| 2011/0025310 A1 | 2/2011 | Moura et al. | |
| 2011/0298411 A1* | 12/2011 | Yoshida et al. | 318/640 |
| 2012/0283978 A1* | 11/2012 | Watanabe | 702/94 |

OTHER PUBLICATIONS

"Pauls Online Notes: Calculus II—Tangent, Normal and Binormal Vectors" http://tutorial.math.lamar.edu/Classes/CalcII/TangentNormalVectors.aspx, Accessed Aug. 13, 2007.*

Search report from E.P.O., mail date is Mar. 6, 2012.

* cited by examiner

METHOD AND ROTARY ENCODER FOR ESTIMATION OF ECCENTRIC VALUE

CROSS-REFERENCE TO RELATED APPLICATIONS

The present application claims priority under 35 U.S.C. §119 of Japanese Application No. 2010-283302 filed on Dec. 20, 2010, the disclosure of which is expressly incorporated by reference herein in its entirety.

BACKGROUND OF THE INVENTION

1. Field of the Invention

The present invention relates to an angle detection apparatus and a method of estimating an amount of eccentricity of the same.

2. Description of Related Art

A rotary encoder is an angle detection apparatus that detects a rotation angle of a rotation mechanism. The rotary encoder basically includes a circular grating disk and a measurer, for example, the grating disk being etched with a scale pattern including scale marks of several hundreds to several hundred thousands in a radial direction in an external peripheral portion, the measurer being arrayed proximate to the scale pattern of the grating disk and counting passed scale marks as the grating disk rotates. Such a rotary encoder is provided such that the grating disk engages a rotating portion of an object to be measured. The number of scale marks passed by a detector in association with rotation of the object to be measured is counted to detect a rotation angle of the object to be measured.

A rotation axis of the grating disk is, for example, a rolling bearing that rotatably supports the grating disk. The rotation accuracy of the rolling bearing is several ten μm. In general, the rotation axis is centered on the ideal rotation center of the detector and moves along the periphery at a maximum rotation accuracy of a radius. To fix the grating disk and the rotation axis, a jig or the like is used for highly accurate adjustment to match the center of the grating disk and the center of the rotation axis. Thus, the center of the grating disk moves on the same periphery as that of the rotation axis, causing eccentricity relative to the ideal rotation center. Such eccentricity causes an error in a detected angle, such as a change in apparent intervals between the scale marks due to misalignment of the radial position of the scale pattern that the detector reads for angle detection.

A conventional method of eliminating an eccentricity error of a grating disk is disclosed in Japanese Patent No. 4433240, for example. In the method, a grating disk is provided inside a scale pattern with numerous concentric patterns at the same intervals as pitches of the scale pattern. Two detectors are arrayed, which are a measurement detector reading the scale pattern and a correction detector provided at a position rotated by 90° from the measurement detector to read the concentric patterns. Then, the correction detector reads the concentric patterns to correct read signals of the scale pattern generated by the measurement detector, thus eliminating an impact of eccentricity from the read signals of the scale pattern.

The method, however, requires a special grating disk to which numerous concentric patterns are added for correction of eccentricity. Furthermore, with only one detector to read the concentric patterns, the amount of eccentricity of the grating disk eccentric on a two-dimensional plane surface cannot be accurately measured.

SUMMARY OF THE INVENTION

A feature of the present invention is to provide an angle detection apparatus and a method of estimating an amount of eccentricity of the same capable of accurately measuring an amount of eccentricity of a grating disk eccentric on a two-dimensional plane surface without requiring a special grating disk.

An aspect of the present invention provides an angle detection apparatus including a grating disk supported by a rotation axis; three or more detectors arrayed proximate to a front surface of the grating disk at equal distances in a circumferential direction of the grating disk; and an eccentricity amount estimator causing each of the detectors to detect a rotation angle of the grating disk rotated by a reference angle from a predetermined initial position; measuring an angle error at each of the detectors from a difference between the rotation angle and the reference angle; acquiring a tangential vector by rotating by 90° a directional vector of each of the detectors relative to the rotation center of the rotation axis; and calculating an eccentricity vector whose inner product with the tangential vector is the angle error.

Another aspect of the present invention provides a method of estimating an amount of eccentricity of an angle detection apparatus comprising a grating disk supported by a rotation axis and three or more detectors arrayed proximate to a front surface of the grating disk at equal distances in a circumferential direction of the grating disk. The method includes causing each of the detectors to detect a rotation angle of the grating disk rotated by a reference angle from a predetermined initial position; measuring an angle error at each of the detectors from a difference between the rotation angle and the reference angle; acquiring a tangential vector by rotating by 90° a directional vector of each of the detectors relative to the rotation center of the rotation axis; and calculating an eccentricity vector whose inner product with the tangential vector is the angle error.

The present invention is provided on the basis of a finding that the eccentricity of the rotation center functions as an eccentricity vector relative to the rotation angle detected by each of the detectors, thus causing the angle error, which is equivalent to the inner product of the eccentricity vector and the tangential vector at each of the detectors. In the present invention, the eccentricity vector can thus be calculated that represents the eccentricity of the rotation center relative to the detector center based on measureable values of the angle error generated at each of the detectors associated with rotation of the grating disk only by the reference angle and the directional vector of each of the detectors. Accordingly, the eccentricity of the rotation center can be corrected based on the calculated eccentricity vector, thus enhancing accuracy of the angle detection apparatus.

It is preferred in the present invention that the eccentricity vector be calculated for a plurality of times with respect to different reference angles rotated from the initial position; the detector center be determined from a plurality of calculated eccentricity vectors; and the eccentricity vector of the rotation center of the rotation axis relative to the detector center be calculated from one of an initial eccentricity vector from the detector center to the initial position and the eccentricity vector.

In the present invention, the eccentricity vector is repeatedly calculated to detect and correct the eccentricity of the rotation center of the rotation axis relative to the detection center.

It is preferred in the present invention that the reference angle be an average value of detected angles of the respective detectors. The average value may be calculated from detected angles of all detectors and alternatively from a detected angle of any detector. Averaging the detected angles of the detectors at different positions in the present invention reduces an effect of eccentricity and provides an approximate value of the reference position.

In the present invention, the reference angle may be detected by another angle detection apparatus connected to the rotation axis. Although an additional configuration is required in such a case, a reference position can be correctly detected.

According to the angle detection apparatus and the method of estimating the amount of eccentricity of the same of the present invention, the amount of eccentricity of the grating disk eccentric on a two-dimensional plane surface can be measured correctly even without using a special grating disk.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
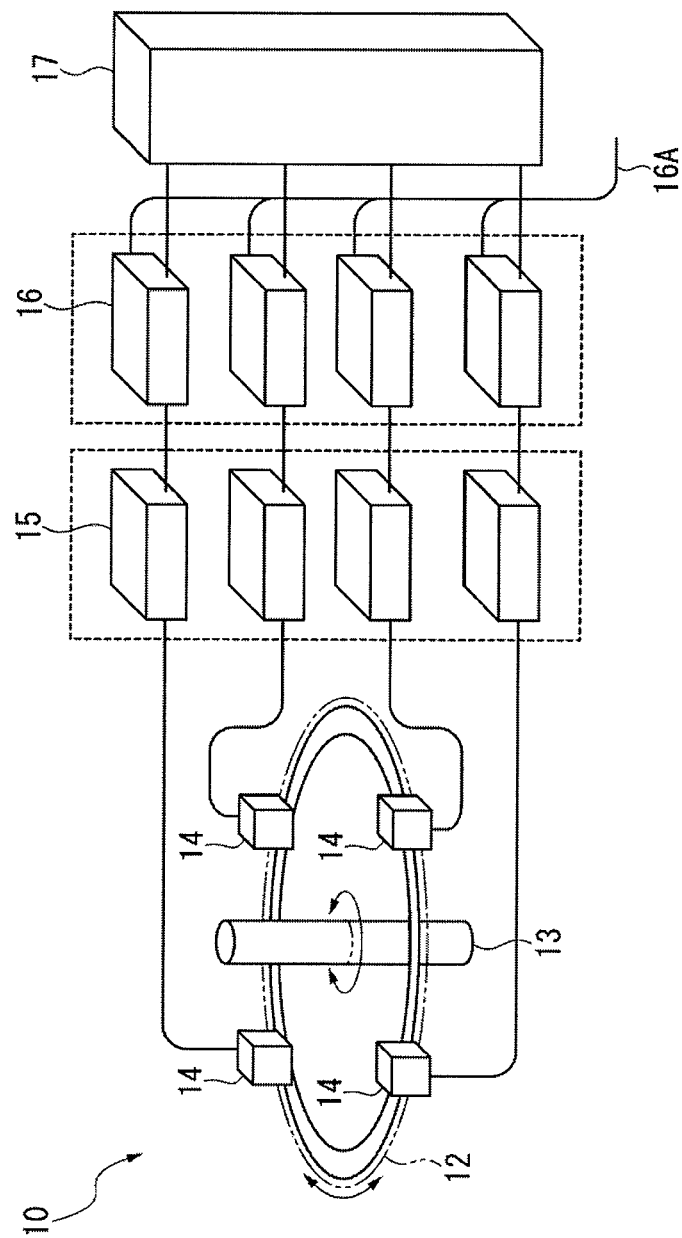
FIG. 1 is a schematic view illustrating an embodiment of the present invention.

An embodiment of the present invention is explained below with reference to the drawings. With reference to FIG. 1, an angle detection apparatus 10 has a grating disk 12 on which a scale pattern 11 is provided along an external periphery. The grating disk 12 is rotatably supported by a rotation axis 13. The scale pattern 11 includes fine scale marks (not shown in the drawing) extending in a radial direction of the grating disk 12.

A detector 14 is arrayed opposite to the scale pattern 11. The detector 14 outputs sinusoidal detection signals corresponding to scale marks that pass through the detector 14 along with rotation of the grating disk 12. The angle detection apparatus 10 of the present embodiment is provided with four detectors 14. Output from the detectors 14 is connected to a calculator 17 through four respective interpolators 15 and counters 16. The counters 16 each receive from outside a latch signal and an initialization signal 16A to read a current count and reset the counter to zero, respectively.

The calculator 17 processes the detection signals input from the detectors 14 through the interpolators 15 and the counters 16 and acquires a rotation angle position or change amount and angle velocity of the rotation axis 13 and the grating disk 12. The calculator 17 is composed of a computer system that executes processing based on designated programs. The calculator 17 is operated externally from an input apparatus (not shown in the drawing) and outputs signals or images to an output apparatus. The calculator 17, which acts as an eccentricity amount estimator of the present invention, has programs that execute eccentricity vector calculation (refer to FIG. 5) and eccentricity correction (refer to FIG. 9) of the present invention, which will be described below.

Figure 2:
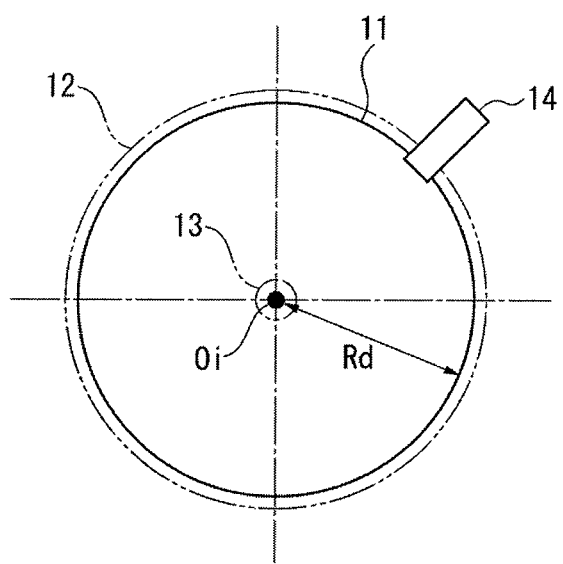
FIG. 2 is a schematic view illustrating a state of no eccentricity at the rotation center in the embodiment above.

In the angle detection apparatus 10, the rotation axis 13 is supported by a main body of the angle detection apparatus 10 through a bearing mechanism (not shown in the drawing) at the rotation centers of the grating disk 12 and the rotation axis 13; the grating disk 12 is fixed to the rotation axis 13; and the scale pattern 11 is provided on a front surface of the grating disk 12. The detectors 14 are supported by the main body of the angle detection apparatus 10. With reference to FIG. 2, in the case where the components above are ideally configured, the mechanical centers of the rotation axis 13, the grating disk 12, and the scale pattern 11 are all matched at the rotation center Oi of the main body of the angle detection apparatus 10. The detectors 14 are then arrayed in equal angle positions at equal distances along a predetermined detection radius Rd from the ideal rotation center Oi.

Figure 3:
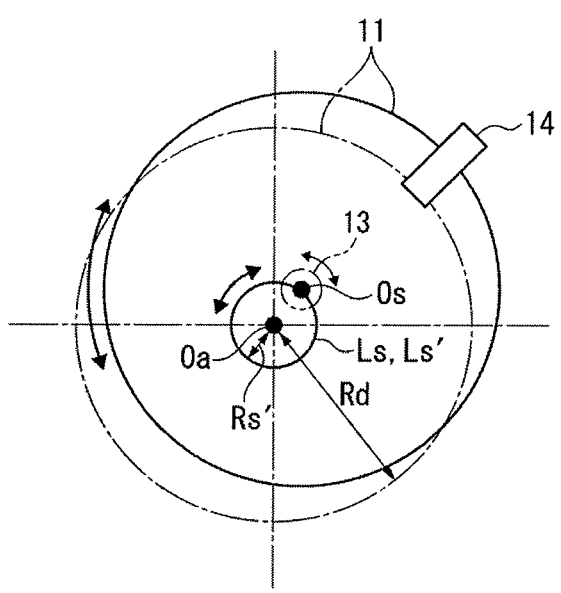
FIG. 3 is a schematic view illustrating a state of eccentricity at the rotation center in the embodiment above.

In reality, however, the rotation axis 13 is misaligned due to axis support, as shown in FIG. 3. The rotation axis 13 rotates eccentric to the ideal rotation center and the center Os (mechanical center) of the rotation axis 13 forms a circular trajectory Ls. The trajectory Ls of the rotation axis 13 having an eccentric center does not practically form a perfect circle, but forms a wavy pattern as show in FIG. 4. In each of the drawings, the eccentricity is schematically exaggerated for explanation purposes, although it is actually substantially small relative to the diameter of the rotation axis 13.

Figure 4:
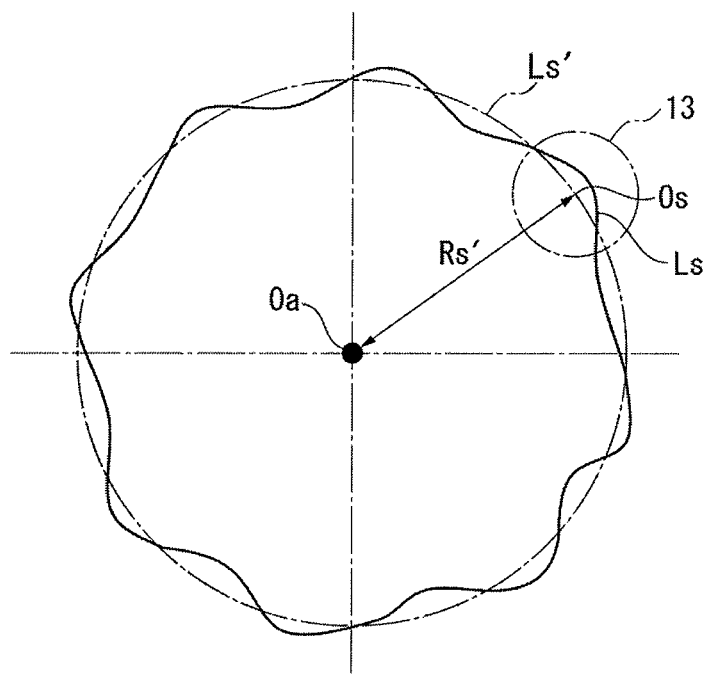
FIG. 4 is a schematic view illustrating an amount of eccentricity at the rotation center in the embodiment above.

In FIG. 4, the trajectory Ls formed by the center Os of the rotation axis 13 is measured; an ideal circle Ls' is drawn through application of a least squares method; and the center position thereof is deemed as the rotation center Oa (operational center) of the rotation axis 13. Thus, a radius Rs' of the ideal circle Ls' is provided as an amount of eccentricity of the rotation center Oa. In addition to the misalignment of the center (mechanical center) of the rotation axis 13 relative to the rotation center Oa (operational center), due to an error in fixing of the rotation axis 13 and the grating disk 12 and an error in forming of the scale pattern 11 relative to the grating disk 12, the rotation center position of the scale pattern 11 to be read by the detectors 14 may be further eccentric relative to the actual rotation center of the rotation axis 13. The eccentricity vector calculation or eccentricity correction according to the present invention can comprehensively correct such eccentricity.

Figure 5:
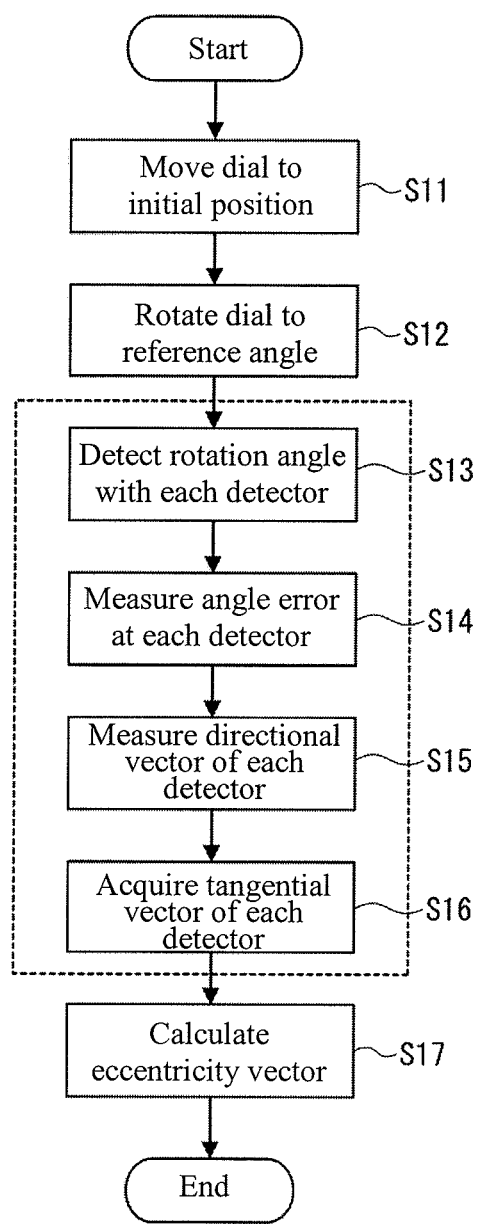
FIG. 5 is a flowchart illustrating a procedure of estimating the amount of eccentricity in the embodiment above.

FIG. 5 illustrates eccentricity vector calculation to calculate an eccentricity vector according to the present invention.

In the eccentricity vector calculation, the grating disk 12 is first moved to a predetermined initial position, where the counters 16 are reset (Step S11). Then, the grating disk 12 is rotated to a predetermined reference angle $\theta_N$ (Step S12). At this position, a rotation angle $\theta_i$ (detector number i=1 to 4) detected by each of the detectors 14 is read out (Step S13). An angle error $\Delta\theta_i$ relative to the reference angle $\theta_N$ is then measured (Step S14). Subsequently, a directional vector $p_i$ from the rotation center Oa to each of the detectors 14 (detector number i=1 to 4) is measured (Step S15). A tangential vector $q_i$ is then acquired in vector calculation (Step S16). Steps S15 and S16 may be performed prior to Steps S13 and S14. Alternatively, Steps S13 and S15 may be performed prior to Steps S14 and S16. An eccentricity vector e is calculated from the tangential vector $q_i$ and the angle error $\Delta\theta_i$ provided as above (Step S17).

The calculation above of the eccentricity vector e is based on the principle below. In Step S11, each of the counters for the respective detectors is reset to 0 with the grating disk 12 at the initial position (any position may be acceptable). It is presumed that the rotation axis 13 is eccentric even at the initial position. It is assumed, however, that the eccentricity vector is 0 at the initial position, which is then set as the reference position of the eccentricity vector.

In the present embodiment, after the grating disk 12 is rotated in Step S12, an average of the measured angles $\theta_1$ to $\theta_4$ of all the detectors 14 is used as an actual measurement value of the reference position $\theta_N$. Specifically, the reference angle $\theta_N$ can be provided in the expression (1) below where the total number of the detectors is n and the detected angle of the detector 14 having a detector number of i is $\theta_i$.

[Expression 1]

$$\theta_N = \frac{1}{n}\sum_{i=1}^{n}\theta_i \qquad (1)$$

Th reference position $\theta_N$ may be an average of two or more detected angles $\theta_i$ of the detectors 14 and alternatively may be a detected angle $\theta_i$ alone of any detector 14. It is effective, however, to use a larger number of detectors so as to enhance accuracy. In Step S14, the difference $\Delta\theta_i$ between the reference angle $\theta_N$ and the measured angle of the detector 14 having a detector number i (hereinafter referred to as detector i) due to eccentricity of the grating disk is provided in the expression (2) below.

[Expression 2]

$$\Delta\theta_i = \theta_N - \theta_i \qquad (2)$$

If the scale pattern 11 of the grating disk 12 is provided with the scale marks at equal intervals, the angle error $\Delta\theta_i$ of the detector i is an error due to eccentricity of the grating disk 12. The angle error $\Delta\theta_i$ is an inner product of the eccentricity vector e and a vector rotated by 90° from the directional vector $p_i$ of the detector i. This point is explained below.

Figure 6:
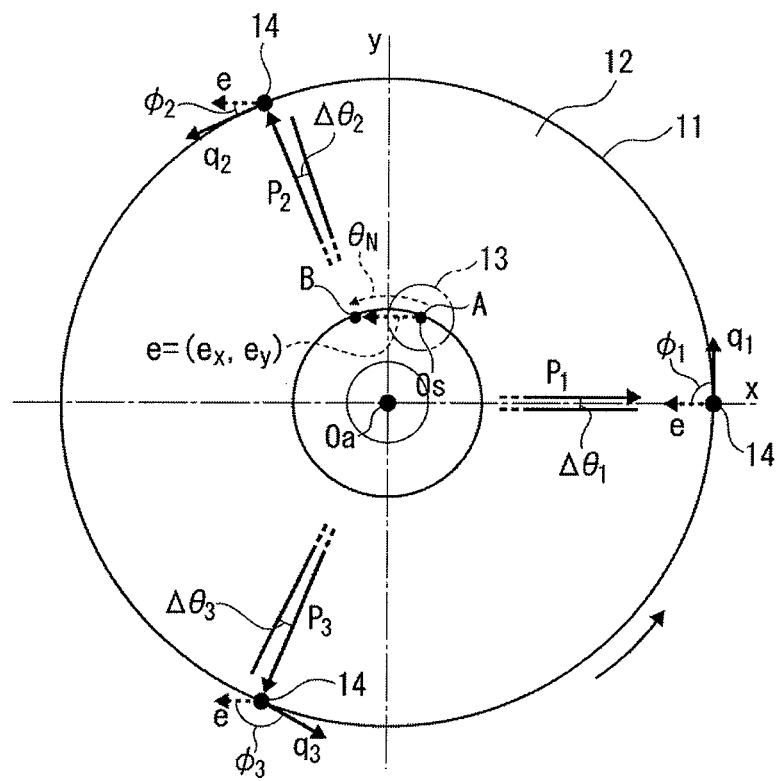
FIG. 6 is a schematic view illustrating an eccentricity vector and a tangential vector in accordance with an angle position of a detector in the embodiment above.

FIG. 6 is an example similar to the present embodiment, but provided with three detectors 14. The grating disk 12 is rotated counterclockwise, and then the grating disk center is moved from a point A to a point B. The eccentricity vector is represented by e from the point A to the point B. The detectors 14 each detect a displacement in a tangential direction of the scale pattern 11. It is assumed that eccentricity does not affect displacement in a direction of viewing the detectors from the rotation center (normal direction on the periphery).

The detected angles of the respective detectors 14 have angle errors $\Delta\theta_1$, $\Delta\theta_2$, and $\Delta\theta_3$ due to eccentricity. With an angle $\phi_i$ defined by the eccentricity vector e and the tangential vector $q_i$ of the detector i, the angle error $\Delta\theta_i$ is a product of $|e|\cos\phi_i$ and $|q_i|$, where $|e|\cos\phi_i$ is the size of the eccentricity vector e in the tangential vector $q_i$ and $|q_i|$ is the size of the tangential vector $q_i$. The angle error $\Delta\theta_i$ is provided in the expression (3) below.

[Expression 3]

$$\Delta\theta_i = |q_i| \times |e|\cos\phi_i \qquad (3)$$

Specifically, the angle error $\Delta\theta_i$ due to eccentricity is an inner product of the eccentricity vector e and the tangential vector $q_i$ of the detector i and is provided in the expression (4) below.

[Expression 4]

$$\Delta\theta_i = q_i \cdot e \qquad (4)$$

The tangential vector $q_i$ of each of the detectors i is a vector orthogonal to the directional vector $p_i$ from the rotation center Oa to the detector i. The directional vector $p_i$ can be acquired from a mechanical configuration of the angle detection apparatus 10. Thus, rotating the directional vector $p_i$ by 90° in vector calculation converts the vector into the tangential vector $q_i$. For such vector calculation of 90° rotation, a rotation matrix T can be used, such as shown in the expression (5) below, that rotates a vector by 90° counterclockwise in a two-dimensional space.

[Expression 5]

$$T = \begin{pmatrix} \cos(\pi/2) & -\sin(\pi/2) \\ \sin(\pi/2) & \cos(\pi/2) \end{pmatrix} = \begin{pmatrix} 0 & -1 \\ 1 & 0 \end{pmatrix} \qquad (5)$$

With such a rotation matrix T, the tangential vector $q_i$ is acquired from the directional vector $p_i$ as shown in the expression (6) below.

[Expression 6]

$$q_i = T \cdot p_i \qquad (6)$$

Matrix notation of the eccentricity vector e, the directional vector $p_i$, and the tangential vector $q_i$ is provided in the expressions (7) and (8) below.

[Expression 7]

$$p_i = \begin{pmatrix} p_{x,i} \\ p_{y,i} \end{pmatrix} \qquad (7)$$

$$q_i = \begin{pmatrix} q_{x,i} \\ q_{y,i} \end{pmatrix}$$

$$e = \begin{pmatrix} e_x \\ e_y \end{pmatrix}$$

-continued

[Expression 8]

$$\Delta\theta_i = q_i \cdot e \quad (8)$$
$$= q_{x,i}e_x + q_{y,i}e_y$$
$$= (q_{x,i} \quad q_{y,i})\begin{pmatrix} e_x \\ e_y \end{pmatrix}$$
$$= q_i^t e$$
$$= (Tp_i)^t e$$
$$= (p_i^t T)e$$
$$= (p_{x,i} \quad p_{y,i})\begin{pmatrix} 0 & 1 \\ -1 & 0 \end{pmatrix}\begin{pmatrix} e_x \\ e_y \end{pmatrix}$$
$$= (-p_{y,i} \quad p_{x,i})\begin{pmatrix} e_x \\ e_y \end{pmatrix}$$

A case of three detectors 14 is described above. A similar relationship is also established in a case of four or more detectors 14. A case of n pieces of detectors 14 is represented as the expression (9) below, and the expression (8) above is provided as the expression (10).

[Expression 9]

$$\Delta\Theta = \begin{pmatrix} \Delta\theta_1 \\ \Sigma\theta_2 \\ \vdots \\ \Delta\theta n \end{pmatrix} \quad (9)$$

$$P = \begin{pmatrix} -p_{y,1} & p_{x,1} \\ -p_{y,2} & p_{x,2} \\ \vdots & \vdots \\ -p_{y,n} & p_{x,n} \end{pmatrix}$$

[Expression 10]

$$\Delta\Theta = Pe \quad (10)$$

Solving the expression (10) for e is provided as the expression (11) below.

[Expression 11]

$$P^t \Delta\Theta = P^t P e$$
$$\therefore e = (P^t P)^{-1} P^t \Delta\Theta \quad (11)$$

Thus, the eccentricity vector e with the grating disk 12 rotated by an angle θ can be determined by using the angle error $\Delta\theta_1$ and the directional vector $p_i$.

In the explanation above on the eccentricity vector calculation, it is assumed that the eccentricity vector e at the initial position is 0. In reality, however, the eccentricity vector e is not 0. It is thus preferable to perform eccentricity correction described below (refer to FIG. 8) for actual correction using the eccentricity vector e.

Figure 7:
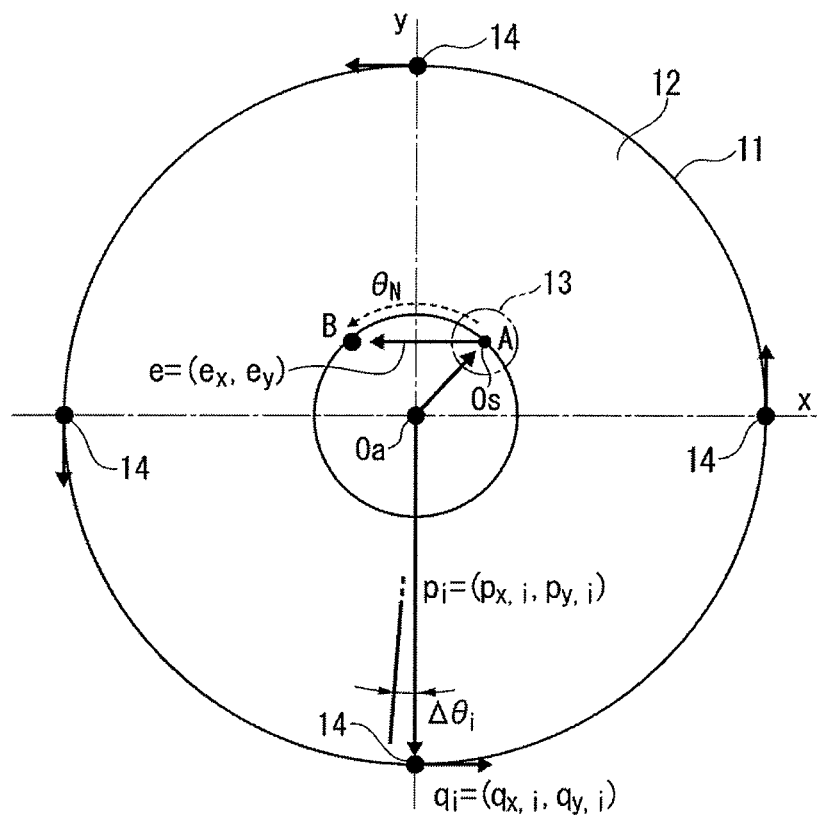
FIG. 7 is a schematic view illustrating an eccentricity vector and a directional vector and a tangential vector of the detector.

In FIG. 7, the directional vector $P_i$ from the rotation center Oa to the detector i, the reference angle $\theta_N$, and the angle error $\Delta\theta_i$ which is the difference between the reference angle $\theta_N$ and the detected angle $\theta_i$ of each detector i are measurable even in the case of the present embodiment (four detectors 14). Based on the measurement, the eccentricity vector e can be acquired in the above-described eccentricity vector calculation (refer to FIGS. 5 and 6). With an initial eccentricity vector $e_{init}$ from the rotation center Oa to the initial position $P_{init}$, relative to the acquired eccentricity vector e, a correct eccentricity vector $e_{est}$ from the rotation center Oa to a current position of each of the detectors 14 is represented in the expression (12) below.

[Expression 12]

$$e_{est} = e + e_{init} \quad (12)$$

Figure 8:
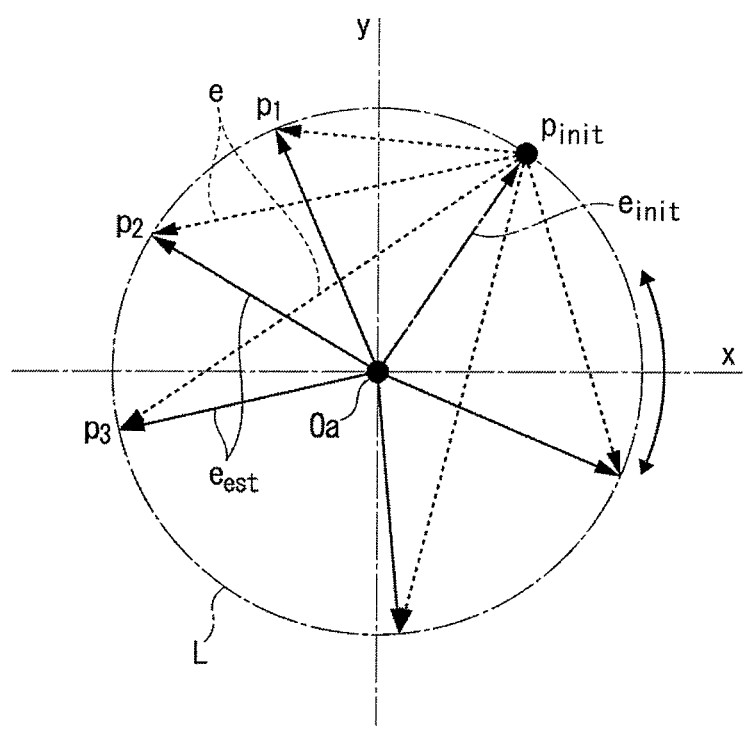
FIG. 8 is a schematic view illustrating an initial eccentricity vector and a plurality of eccentricity vectors in the embodiment above.

Such an initial eccentricity vector $e_{init}$ can be determined as below. With reference to FIG. 8, the above-described eccentricity vector calculation is executed at a plurality of positions $P_1$, $P_2$, and $P_3$; the eccentricity vector e from the initial position $P_{init}$ is acquired at each of the positions; a trajectory of the center of the grating disk 12 (a virtual circle Ls' in FIG. 4) is estimated; and thereby, the correct rotation center Oa is provided. With determination of the initial eccentricity vector $e_{init}$ from the rotation center Oa to the initial position $P_{init}$ as above, the correct eccentricity vector $e_{est}$ can be estimated at any rotation angle θ on a real-time basis from the expression (12).

Figure 9:
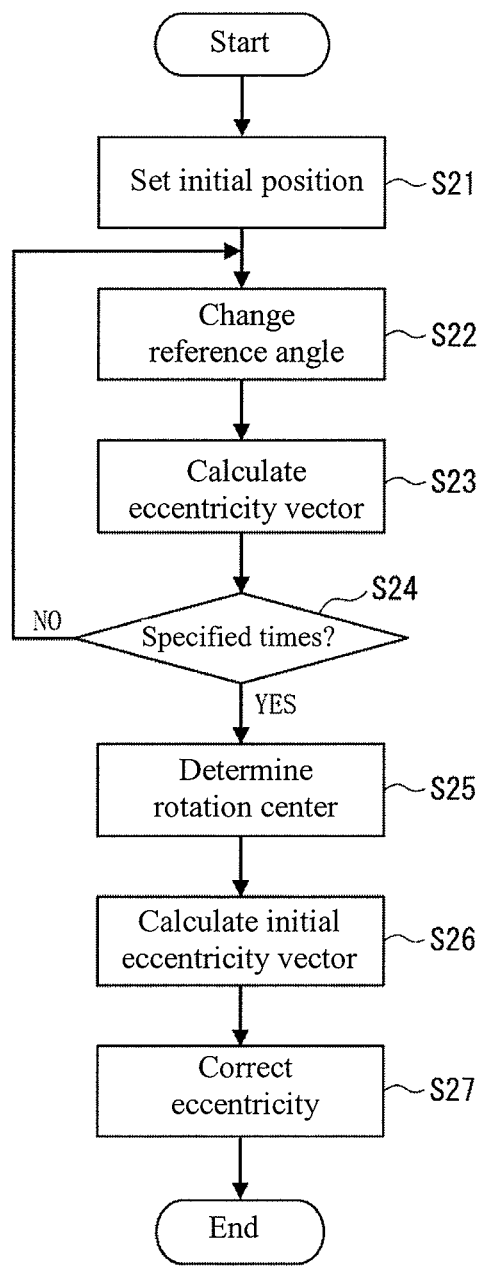
FIG. 9 is a flowchart illustrating a procedure of correcting eccentricity in the embodiment above.

FIG. 9 illustrates eccentricity correction to correct eccentricity according to the present invention. In the eccentricity correction, the initial position $P_{init}$ of the grating disk 12 is first set. The initial position may simply be a current position (Step S21). Then, the reference angle $\theta_N$ is set (Step S22), and the above-described eccentricity vector calculation (refer to FIG. 5) is executed (Step S23). Thus, the grating disk 12 is moved from the initial position (initial position $P_{init}$ in FIG. 8) to a position rotated by the reference angle $\theta_N$ (e.g., $P_1$ in FIG. 8). The eccentricity vector e at this position is then calculated.

The eccentricity vector calculation is repeated for a specified number of times with different reference angles $\theta_N$ (e.g., positions $P_1$ to $P_3$ in FIG. 8) and is ended at the specified number of times (Step S24). After the repetition is completed, the virtual circle Ls' and the rotation center Oa are detected from the eccentricity vectors calculated at the respective positions (Step S25). The initial eccentricity vector $e_{init}$ is calculated from the detected rotation center Oa and the initial position $P_{init}$ (Step S26). With the initial eccentricity vector $e_{init}$ calculated as above, the correct eccentricity vector $e_{est}$ at each position can be calculated from the initial eccentricity vector $e_{init}$ and the eccentricity vector e at each position. The correct eccentricity vector $e_{est}$ allows correction to eccentricity (Step S27).

The present invention is not limited to the above-described embodiment and is deemed to include variations and improvements within a range to achieve the advantages of the present invention. In the eccentricity correction, the eccentricity vector $e_{init}$ from the rotation center Oa to the initial position $P_{init}$ is effective until the initial position is changed. Thus, the initial eccentricity vector $e_{init}$ may be acquired only once at the beginning of operation of a day. In the embodiment above, the eccentricity vector is calculated at a plurality of positions to acquire the virtual circle Ls' and the rotation center Oa. Alternatively, a position detector (origin detector) may be added separately to the rotation axis 13 or the grating disk 12 such that the initial eccentricity amount at the time of initialization is measured and stored appropriately so as to be retrieved from a memory as required.

In the embodiment above, the grating disk 12 is rotated only by the reference angle $\theta_N$ from the initial position. Alternatively, the reference angle $\theta_N$ may be acquired from measurement after appropriate angle rotation. In the present invention, the eccentricity vector e is estimated based on the angle error $\Delta\theta_i$ due to eccentricity which is the difference between the detection angle $\theta_i$ of each of the detectors 14 and the reference angle $\theta_N$. It is thus desirable that the reference angle $\theta_N$ be provided such that the error due to eccentricity and the like is minimized. For example, the reference angle may be an average of detected angles $\theta_i$ of all the detectors 14 in the angle detection apparatus 10. Alternatively, the reference angle may be an angle calibrated/corrected in existing various methods of calibration/correction (including self calibration).

The present invention is suitable to an angle detection apparatus that detects an angle position or angle velocity in a rotating portion.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An angle detection apparatus comprising:
    a grating disk supported by a rotation axis;
    at least three detectors equidistantly positioned opposite a front surface of the grating disk in a circumferential direction of the grating disk; and
    an eccentricity amount estimator configured to cause each of the detectors to:
        detect a rotation angle of the grating disk rotated by a reference angle from a predetermined initial position;
        measure an angle error at each of the at least three detectors from a difference between the rotation angle and the reference angle;
        acquire a tangential vector by rotating by 90° a directional vector of each of the at least three detectors relative to a rotational center of the rotation axis; and
        calculate an eccentricity vector whose inner product with the tangential vector is the angle error, wherein in the calculation of the eccentricity vector;
    the eccentricity vector is calculated a plurality of times with respect to different reference angles rotated from the predetermined initial position;
    a detector center is determined from a plurality of calculated eccentricity vectors; and
    the eccentricity vector of the rotational center of the rotation axis relative to the detector center is calculated from one of an initial eccentricity vector from the detector center to the predetermined initial position and the eccentricity vector.

2. A method of estimating an amount of eccentricity of an angle detection apparatus having a grating disk supported by a rotation axis and at least three detectors equidistantly positioned opposite a front surface of the grating disk in a circumferential direction of the grating disk, the method comprising:
    causing each of the at least three detectors to detect a rotational angle of the grating disk rotated by a reference angle from a predetermined initial position;
    measuring an angle error at each of the at least three detectors from a difference between the rotational angle and the reference angle;
    acquiring a tangential vector by rotating by 90° a directional vector of each of the at least three detectors relative to a rotational center of the rotation axis; and
    calculating an eccentricity vector whose inner product with the tangential vector is the angle error, wherein:
    the eccentricity vector is calculated a plurality of times with respect to different reference angles rotated from the predetermined initial position;
    a detector center is determined from a plurality of calculated eccentricity vectors; and
    the eccentricity vector of the rotational center of the rotation axis relative to the detector center is calculated from one of an initial eccentricity vector from the detector center to the predetermined initial position and the eccentricity vector.

3. The method of estimating the amount of eccentricity of the angle detection apparatus according to claim 2, wherein the reference angle is an average value of the detected rotation angles of the respective detectors.

* * * * *